(12) United States Patent
Sato et al.

(10) Patent No.: US 7,353,748 B2
(45) Date of Patent: Apr. 8, 2008

(54) LINEAR ACTUATOR AND METHOD FOR PROCESSING THE SAME

(75) Inventors: Toshio Sato, Tsukuba (JP); Akira Tadano, Tsuchiura (JP); Gen Tsuchiya, Tsukuba-gun (JP)

(73) Assignee: SMC Kabushiki Kaisha, Tokyo (JP)

( * ) Notice: Subject to any disclaimer, the term of this patent is extended or adjusted under 35 U.S.C. 154(b) by 13 days.

(21) Appl. No.: 11/435,753

(22) Filed: May 18, 2006

(65) Prior Publication Data

US 2006/0260464 A1    Nov. 23, 2006

(30) Foreign Application Priority Data

May 18, 2005   (JP) .............................. 2005-144877

(51) Int. Cl.
*F16J 15/18* (2006.01)

(52) U.S. Cl. ...................... 92/165 R; 92/163

(58) Field of Classification Search .................... 92/88, 92/161, 163, 165 R, 165 PR
See application file for complete search history.

(56) References Cited

U.S. PATENT DOCUMENTS 5,363,741 A * 11/1994 Takada et al. .......... 92/165 PR
5,884,549 A * 3/1999 Hosono et al. ................. 92/88
7,191,695 B2 * 3/2007 Sato et al. ...................... 92/88
7,207,262 B2 * 4/2007 Angue et al. ........... 92/165 PR

FOREIGN PATENT DOCUMENTS

JP      7-110011    4/1995
JP      9-141533    6/1997

* cited by examiner

*Primary Examiner*—Michael Leslie
(74) *Attorney, Agent, or Firm*—Paul A. Guss (57) ABSTRACT

A bent section, which is bent substantially perpendicularly toward a main cylinder body, is formed at one end of a slide table. Further, a pair of ball-rolling grooves, in which a plurality of ball bearings roll, are formed on side surfaces of the slide table opposed to a guide section. A relief groove, which has a width wider than a spacing distance between the ball-rolling grooves and which makes it possible to change the direction of a processing jig when the ball-rolling grooves are processed, is formed at ends of the ball-rolling grooves disposed on a side of the bent section.

6 Claims, 14 Drawing Sheets

FIG. 14

LINEAR ACTUATOR AND METHOD FOR PROCESSING THE SAME

BACKGROUND OF THE INVENTION

1. Field of the Invention

The present invention relates to a linear actuator in which a slider reciprocates in the axial direction of a main cylinder body by introducing a pressure fluid from a fluid inlet/outlet port, and a method for processing the linear actuator to provide rolling grooves for the slider.

2. Description of the Related Art

A linear actuator has been hitherto used as a means for transporting a workpiece or the like. Such a linear actuator transports a workpiece placed on a slide table by allowing the slide table to perform the linear reciprocating motion along a main cylinder body.

The present applicant has proposed a linear actuator comprising a main cylinder body in which a piston is accommodated displaceably therein, a rod which is connected to the piston and which protrudes from the main cylinder body to the outside, and a slide table which includes an end plate connected to an end of the rod and a table connected to the end plate (see Japanese Laid-Open Patent Publication No. 9-141533). In this linear actuator, the slide table is provided displaceably in the axial direction of the main cylinder body. A pair of guide blocks are formed in an expanded manner on the upper surface of the main cylinder body.

In the linear actuator, a guide section of the slide table is inserted into the space between the pair of guide blocks. Ball grooves, on which balls roll, are formed on the guide section and the side surfaces of the guide blocks opposed thereto respectively. When air is supplied to a port of the main cylinder body, the piston is moved, and the slide table, which is attached to the upper surface of the main cylinder body, is moved integrally under the cooperative action of the balls and the guide blocks.

The present applicant has further proposed a linear actuator in which a plurality of columnar roller bearings are provided, and rolling grooves of a slider and guide rails for allowing the roller bearings to roll are provided (see Japanese Laid-Open Patent Publication No. 7-110011). Each of the rolling grooves is formed to have a substantially V-shaped cross section. The roller bearings and rolling grooves are provided in place of the balls and the ball grooves in the linear actuator of Japanese Laid-Open Patent Publication No. 9-141533 described above. In this linear actuator, the plurality of roller bearings are inclined alternately by 90° along the rolling grooves. When the slide table is displaced along the main cylinder body, the roller bearings roll along the rolling grooves.

In general, in the case of the linear actuators as described above, additional processing is applied to the ball grooves and the rolling grooves when the slide table is formed. Accordingly, accuracy is improved for the ball grooves and the rolling grooves to reduce the sliding resistance brought about when the balls and the roller bearings roll. The processing is performed, for example, such that a rotating polishing jig is moved along the ball groove and the rolling groove in a state in which the rotating polishing jig abuts against the ball groove and the rolling groove.

In relation to the conventional techniques as described above, there is a demand to integrally form the end plate and the table of the slide table in order to reduce the number of parts of the linear actuator and the number of steps of assembling the linear actuator.

SUMMARY OF THE INVENTION

A general object of the present invention is to provide a linear actuator and a method for processing the same, wherein rolling grooves of a slider having a bent section can be efficiently processed, for the roll of the rolling members in the rolling grooves.

The above and other objects, features, and advantages of the present invention will become more apparent from the following description when taken in conjunction with the accompanying drawings in which preferred embodiments of the present invention is shown by way of illustrative example.

DESCRIPTION OF THE PREFERRED EMBODIMENTS

Figure 1:
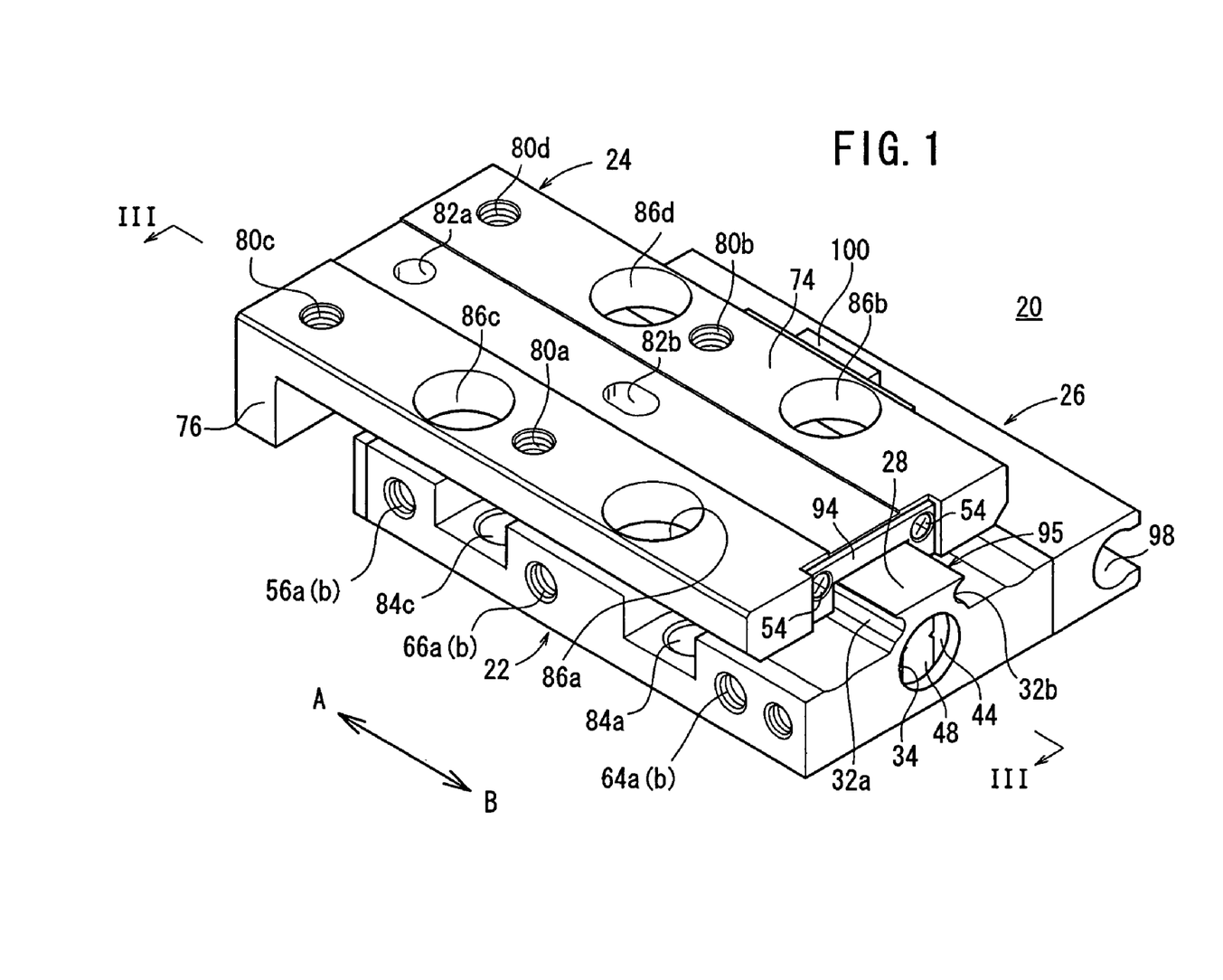
FIG. 1 is a perspective view illustrating an entire linear actuator according to an embodiment of the present invention.

With reference to FIG. 1, reference numeral 20 indicates a linear actuator to which a processing method according to an embodiment of the present invention is applied.

Figure 2:
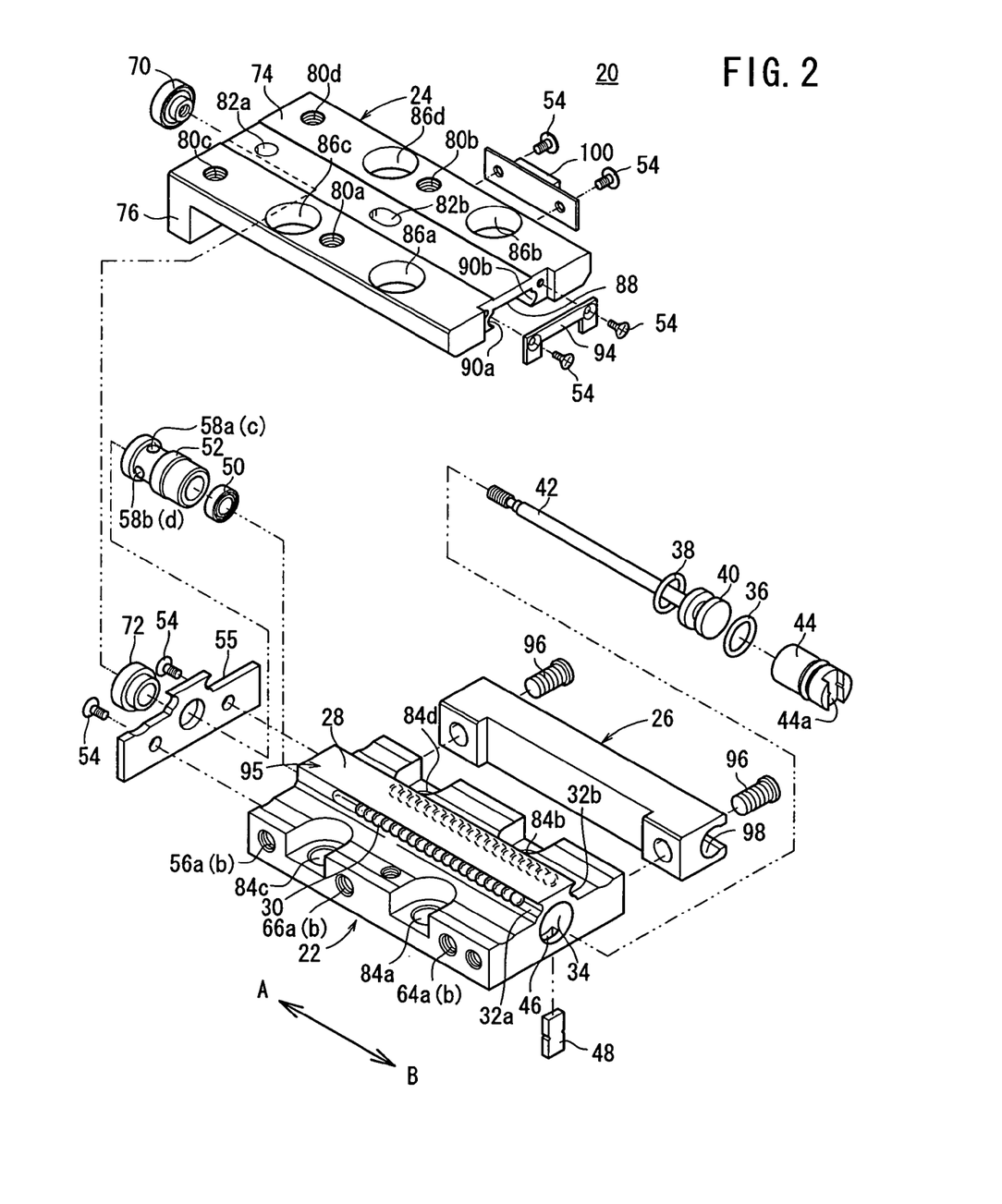
FIG. 2 is an exploded perspective view illustrating the linear actuator shown in FIG. 1.

As shown in FIGS. 1 and 2, the linear actuator 20 comprises a main cylinder body 22, a slide table (slider) 24 which reciprocates in the axial direction of the main cylinder body 22, and a sensor attachment rail 26 which is fixed to one side surface of the main cylinder body 22.

A guide section 28, which extends in the axial direction (directions of the arrows A and B) of the main cylinder body 22, is formed to expand on an upper surface portion of the main cylinder body 22. Ball-rolling grooves (rolling grooves) 32a, 32b, in which a plurality of ball bearings (rolling members) 30 (see FIG. 2) roll, are formed in the axial direction on mutually opposing side surfaces of the guide section 28. Each of the ball-rolling grooves 32a, 32b is recessed to have a substantially semicircular cross section corresponding to the cross-sectional shape of the ball bearing 30.

Figure 3:
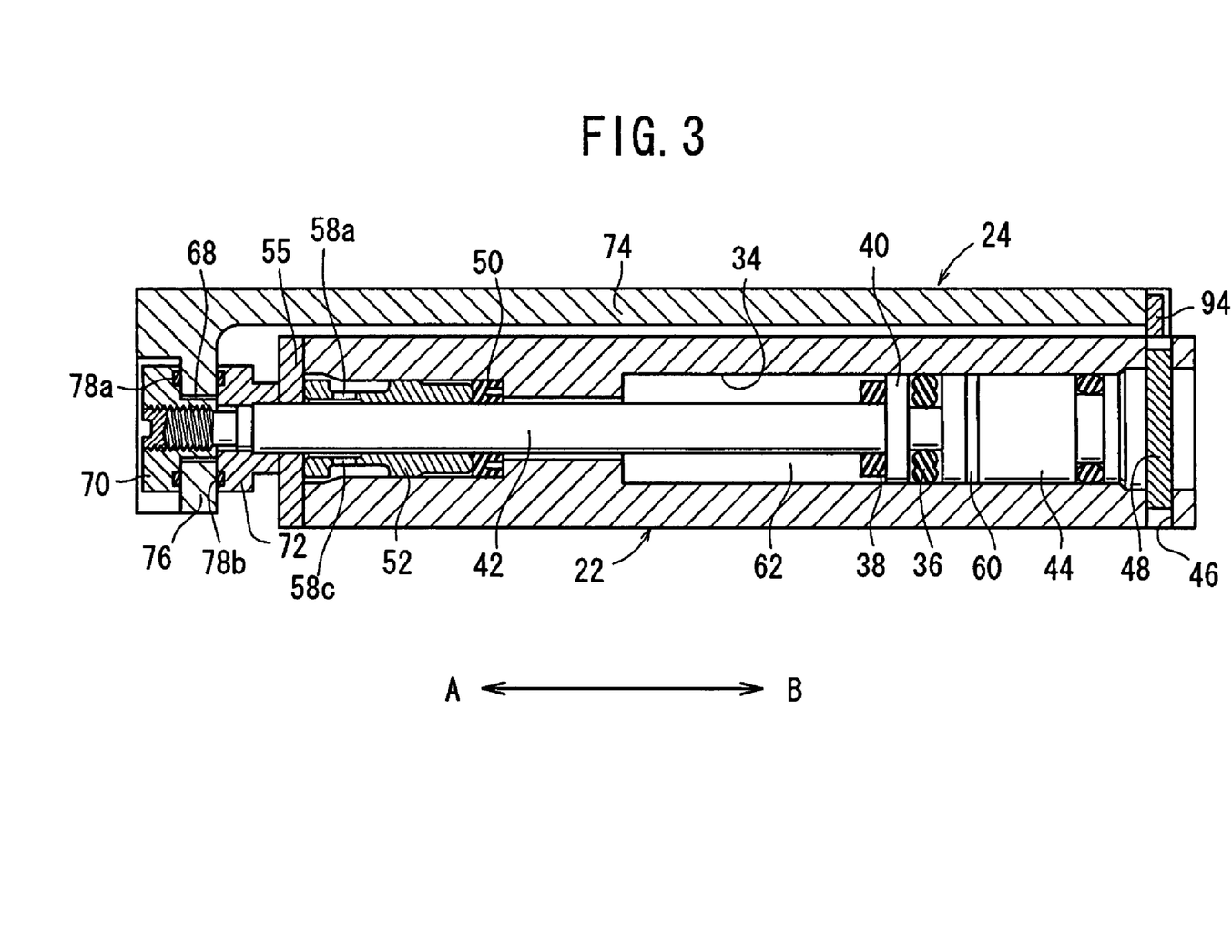
FIG. 3 is a longitudinal sectional view taken along a line III-III shown in FIG. 1.

As shown in FIGS. 2 and 3, a through-hole 34 is formed in the axial direction in the main cylinder body 22. A piston 40 and a piston rod 42 are accommodated in the through-hole 34, wherein a piston packing 36 and a damper 38 are installed to an outer circumferential surface of the piston 40, and the piston rod 42 is connected to the piston 40.

One end of the through-hole 34 is closed by an end cap 44. The end cap 44 is fastened such that a fastening piece 48, which is inserted along a hole 46 from the bottom surface of the main cylinder body 22, is engaged with a fastening groove 44a (see FIG. 2) formed on the end cap 44 (see FIG. 3). That is, the end cap 44 is prevented from being disengaged to the outside of the through-hole 34 by means of the fastening piece 48.

The other end of the through-hole 34 is closed by a rod packing 50 and a rod cover 52 which make sliding contact with the outer circumferential surface of the piston rod 42 and which are retained in the through-hole 34.

The rod cover 52 is formed of a resin material to have a substantially cylindrical shape. The rod cover 52 is fastened by an end plate 55 which is installed to the end surface of the main cylinder body 22. The end plate 55 is secured to the main cylinder body 22 by means of screws 54 (see FIG. 2).

The rod cover 52 functions as a bearing for the piston rod 42. The rod cover 52 has a plurality of holes 58a to 58d which are formed in the circumferential direction. The holes 58a to 58d are provided in order to suck the dust or the like generated at the bearing portion of the piston rod 42 and the sliding movement portion with respect to the rod packing 50 when the vacuum suction is performed through a vacuum port 56a (56b) as described later on.

In this arrangement, a first cylinder chamber 60 and a second cylinder chamber 62 are formed by the end cap 44 and the rod cover 52 which close the through-hole 34, respectively (see FIG. 3).

A pair of first fluid inlet/outlet ports 64a, 64b and a pair of second fluid inlet/outlet ports 66a, 66b are provided on the mutually opposing side surfaces of the main cylinder body 22. The first fluid inlet/outlet ports 64a, 64b and the second fluid inlet/outlet ports 66a, 66b are arranged at positions at which they are symmetrical about the center of the axis of the main cylinder body 22 respectively (see FIG. 4). The first fluid inlet/outlet ports 64a, 64b are communicated with the first cylinder chamber 60, and the second fluid inlet/outlet ports 66a, 66b are communicated with the second cylinder chamber 62, respectively.

A floating mechanism, which absorbs deflection between the slide table 24 and the piston rod 42, is provided at the tip end of the piston rod 42. The floating mechanism includes a first bush 70 and a second bush 72 for interposing the slide table 24 with a clearance 68 (see FIG. 3).

The slide table 24 is formed to have a substantially L-shaped cross section including a flat plate-shaped table section (flat surface section) 74 and a bent section 76. The slide table 24 is integrally formed by means of metal injection molding. The slide table 24 may be integrally formed by means of casting. In this arrangement, an unillustrated buffer member is inserted into a hole of the bent section 76. The buffer member functions to reduce the impact generated when the bent section 76 abuts against the end surface of the main cylinder body 22 at one displacement terminal end of the slide table 24.

O-rings 78a, 78b are fitted to annular grooves on the contact surfaces of the first and second bushes 70, 72 for interposing the bent section 76, respectively. The O-rings 78a, 78b function to avoid the outflow of the dust to the outside generated when the first and second bushes 70, 72 are subjected to floating.

As shown in FIGS. 1 and 2, the table section 74 is formed with four workpiece-retaining holes 80a to 80d, positioning holes 82a, 82b of a circular hole and a slotted hole, and four penetrating through-holes 86a to 86d which correspond to attachment holes 84a to 84d of the main cylinder body 22 (see FIG. 2). The positioning holes 82a, 82b are arranged on a straight line so that they are disposed on the axis of the table section 74.

In this arrangement, attachment bolts (not shown) can be screwed into the attachment holes 84a to 84d of the main cylinder body 22 via the through-holes 86a to 86d from the upper surface of the table section 74 to attach the main cylinder body 22 to another member. Alternatively, the attachment bolts can be directly screwed into the attachment holes 84a to 84d from the bottom surface of the main cylinder body 22 to effect the attachment. As described above, an operator can attach the linear actuator 20 while selecting any one of the upward direction and the downward direction of the attachment of the linear actuator 20.

Figure 4:
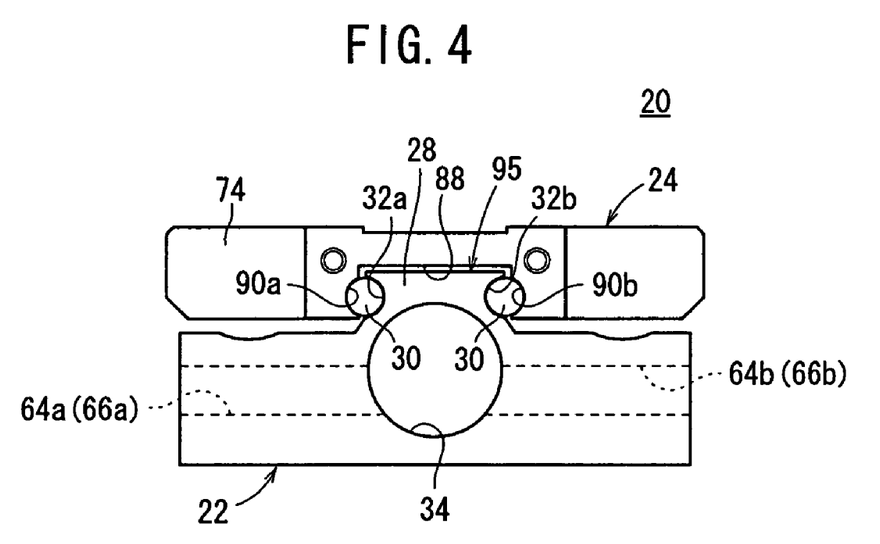
FIG. 4 is, with partial omission, a schematic side view as viewed in the axial direction, illustrating the linear actuator shown in FIG. 1.
Figure 5:
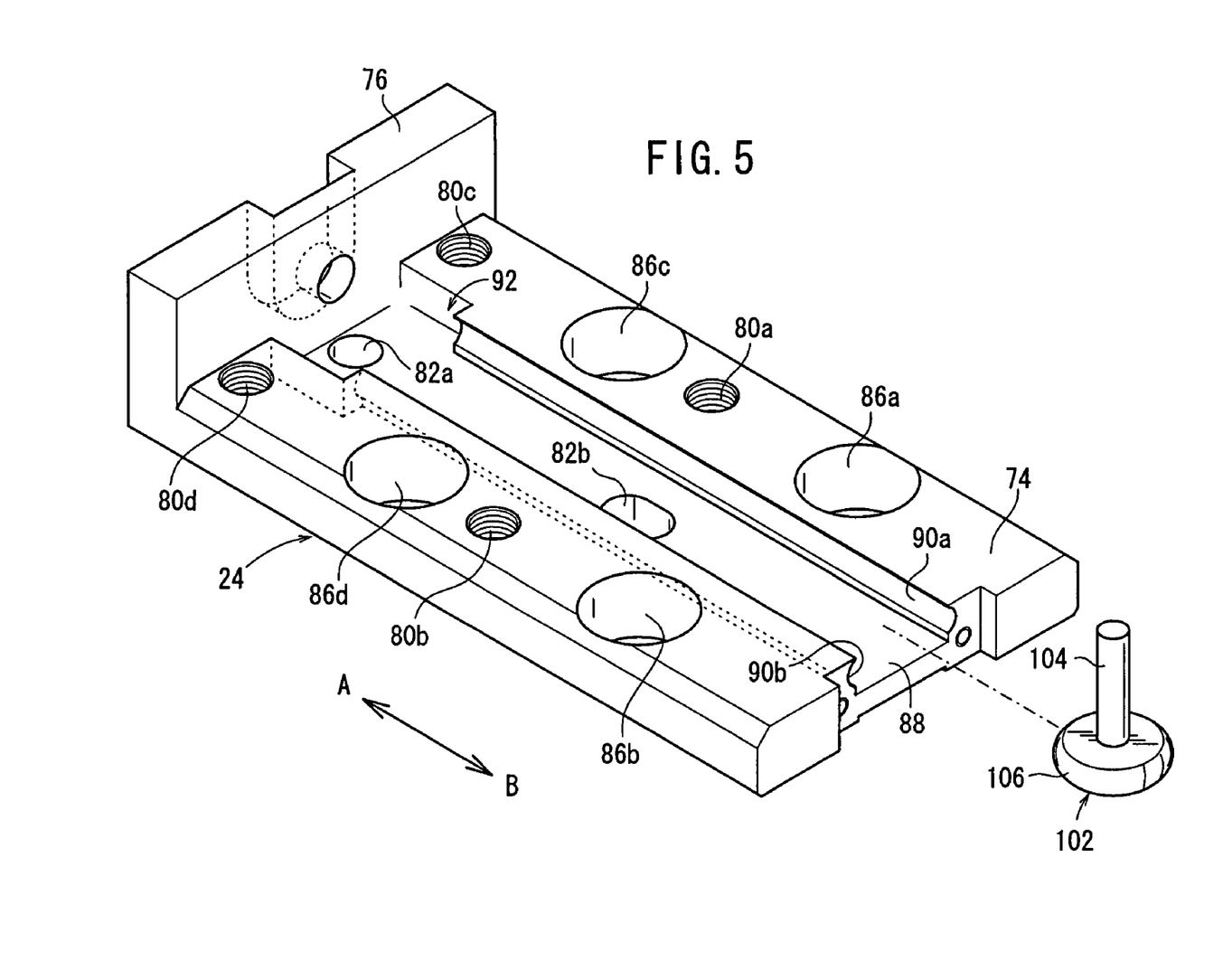
FIG. 5 is a perspective view illustrating a slide table shown in FIG. 1, and a processing jig for processing ball-rolling grooves of the slide table.
Figure 6:
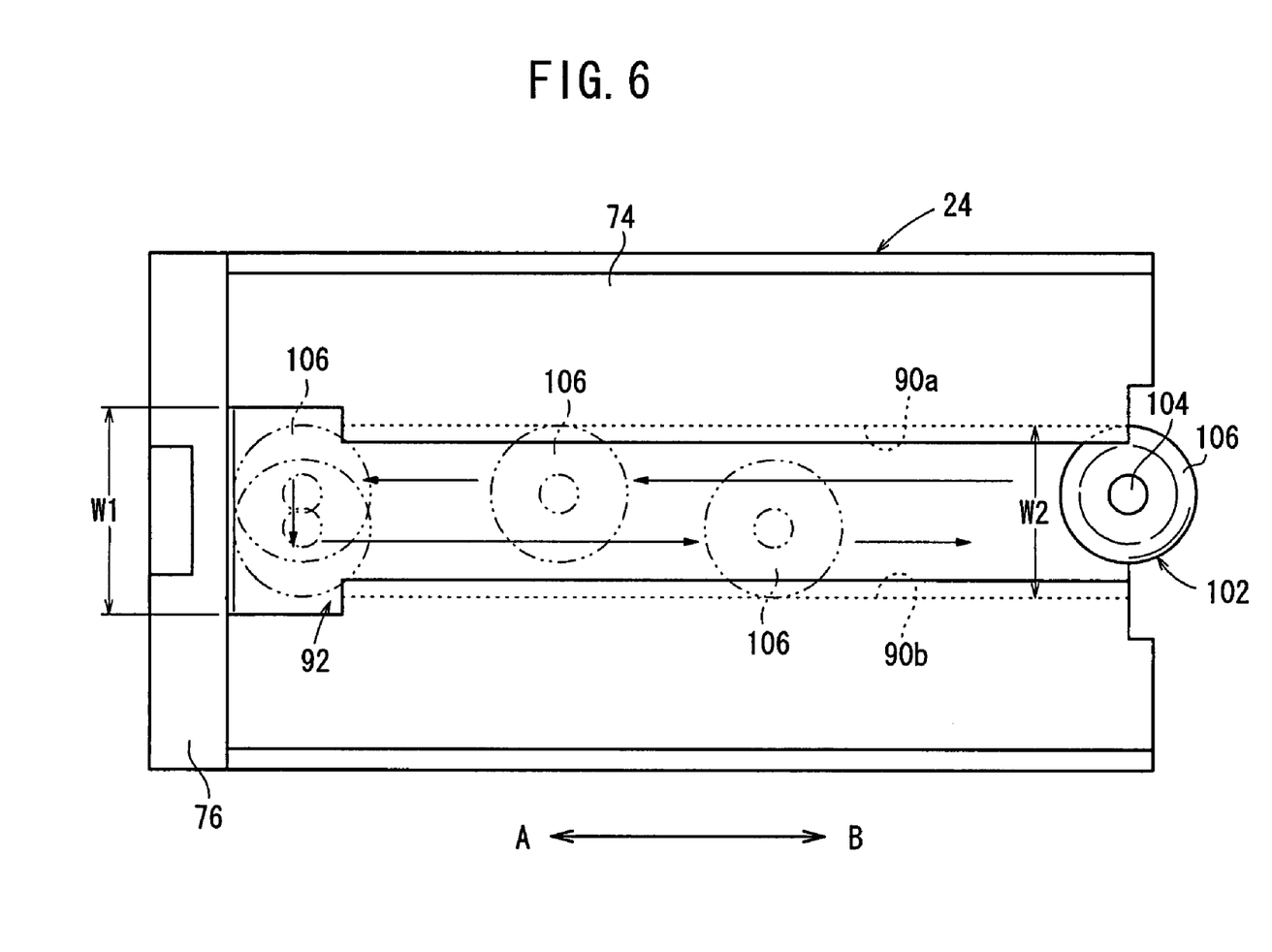
FIG. 6 is a schematic plan view illustrating a situation in which the ball-rolling grooves of the slide table shown in FIG. 5 are processed by using the processing jig.

On the other hand, as shown in FIGS. 4 to 6, a guide groove 88, which extends in the longitudinal direction, is formed on a lower surface portion of the slide table 24. A pair of ball-rolling grooves (rolling grooves) 90a, 90b, which are opposed to one another, are formed in the longitudinal direction in the guide groove 88. The ball-rolling grooves 90a, 90b are formed and recessed to have substantially semicircular cross sections corresponding to the cross-sectional shape of the ball bearing 30.

The guide groove 88 is formed to correspond to the guide section 28 of the main cylinder body 22. The slide table 24 is engaged with the upper portion of the main cylinder body 22 by the aid of the guide groove 88.

A relief groove (recess) 92, which is recessed to have a substantially rectangular shape, is formed adjacently to the bent section 76 on a lower surface portion of the slide table 24. The relief groove 92 is communicated with the ball-rolling grooves 90a, 90b and the guide groove 88. That is, the relief groove 92 is formed at the ends of the guide groove 88 and the ball-rolling grooves 90a, 90b.

Figure 7:
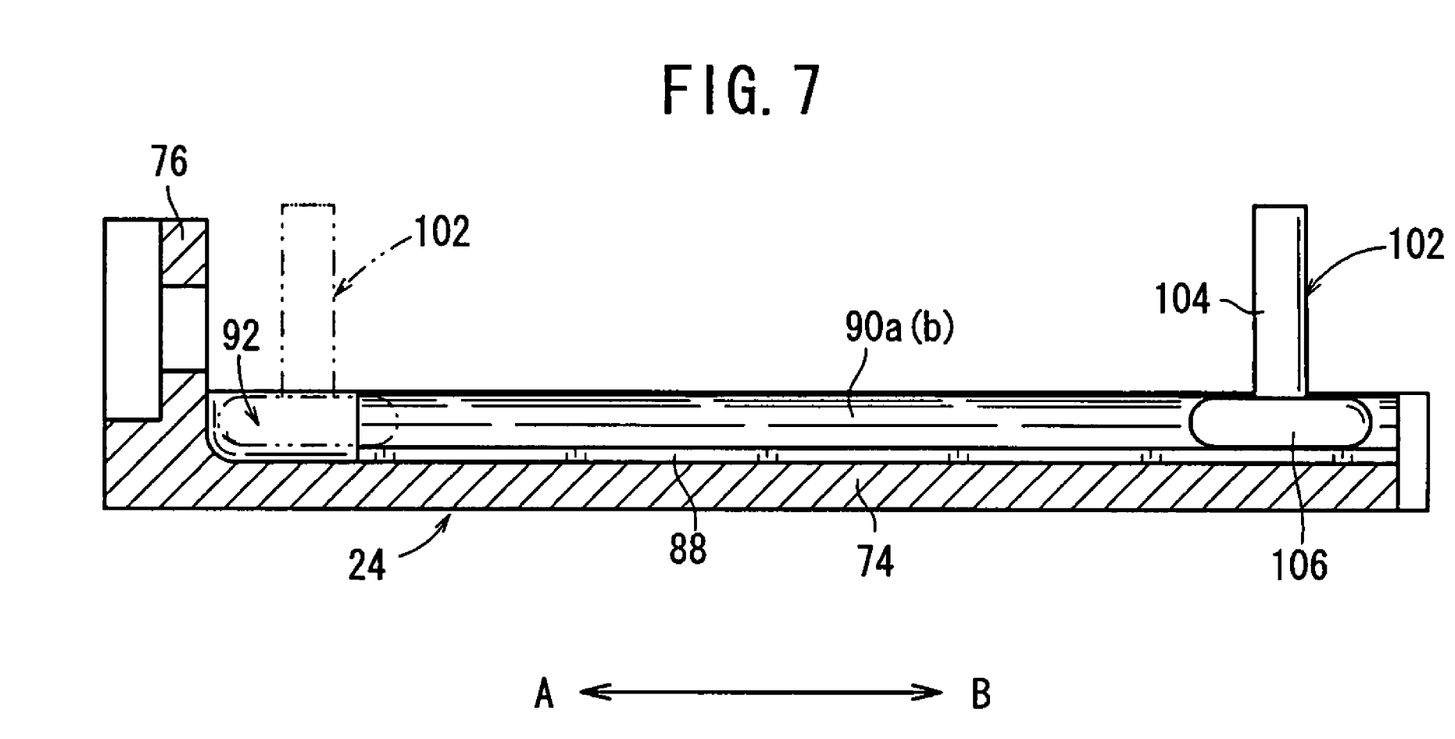
FIG. 7 is a schematic longitudinal sectional view illustrating a situation in which the slide table shown in FIG. 6 is processed.

The depth of the relief groove 92 is substantially equivalent to the depth of the guide groove 88 (see FIG. 7). Further, the widthwise dimension W1 of the relief groove 92, which is in the direction substantially perpendicular to the axis of the slide table 24, is set to be larger than the spacing distance W2 between one ball-rolling groove 90a and the other ball-rolling groove 90b (W1>W2 as shown in FIG. 6). In other words, the inner wall surfaces of the relief groove 92 are formed such that the inner wall surfaces are separated from the ball-rolling grooves 90a, 90b respectively in the directions substantially perpendicular to the axis of the slide table 24.

That is, the ball-rolling grooves 90a, 90b extend by a predetermined length toward the bent section 76 (in the direction of the arrow A) on the lower surface portion of the slide table 24, while the relief groove 92 is formed, which adjoins the wall surface of the bent section 76 and which has the widthwise dimension larger than the spacing distance W2 between the ball-rolling grooves 90a, 90b.

A plate 94, which closes the guide groove 88 and the ball-rolling grooves 90a, 90b, is installed by the screws 54 to one end surface of the table section 74. Accordingly, the ball bearings 30, which roll along the ball-rolling grooves 90a, 90b, are prevented from being disengaged from the slide table 24 including the table section 74.

The slide table 24 is guided by a guide mechanism 95 in the axial direction of the main cylinder body 22. The guide mechanism 95 includes the guide section 28 which is formed to expand on the upper surface portion of the main cylinder body 22 and which has the pair of ball-rolling grooves 32a, 32b formed on both side surfaces thereof, the guide groove 88 which is formed on the lower surface portion of the slide table 24, and the pair of ball-rolling grooves 90a, 90b which are formed on both side surfaces of the guide groove 88.

As shown in FIG. 2, the sensor attachment rail 26 is detachably provided by bolts 96 on one side surface of the main cylinder body 22. The sensor attachment rail 26 is formed to have a substantially U-shaped cross section. Both ends of the sensor attachment rail 26 are fixed by the bolts 96, respectively. One stripe of slotted hole 98, which has a circular arc-shaped cross section, is formed in the axial direction on the sensor attachment rail 26. A sensor (not shown) is selectively installed to a predetermined portion thereof.

A gap, which is separated from the side surface of the main cylinder body 22 by a predetermined spacing distance except for both ends, is formed on the other side surface of the sensor attachment rail 26. Further, a magnetic member 100 is fixed to a predetermined portion of the side surface of the slide table 24 by the aid of an attachment fixture. The magnetic member 100 is arranged in the gap between the sensor attachment rail 26 and the main cylinder body 22. Therefore, the magnetic field of the magnetic member 100 which is displaceable together with the slide table 24 is detected by the sensor (not shown) installed to the sensor attachment rail 26. Accordingly, the position of the slide table 24 is detected.

The vacuum ports 56a, 56b are provided on the side surfaces of the main cylinder body 22 respectively. A suction mechanism such as an unillustrated vacuum pump is connected to the vacuum port 56a (56b) to vacuum-suck the air leaked from the second cylinder chamber 62 and the dust generated by the sliding movement of the piston rod 42 and the rod packing 50, through the holes 58a to 58d formed for the rod cover 52. Accordingly, the linear actuator 20 can be appropriately used, for example, in an environment such as a clean room in which cleanness is required.

The linear actuator 20 according to the embodiment of the present invention is basically constructed as described above. Next, an explanation will be made about a method of processing and polishing the ball-rolling grooves 90a, 90b of the slide table 24 by means of a processing jig 102. The polishing process is applied to the ball-rolling grooves 90a, 90b by means of the processing jig 102 in order to reduce sliding resistance when the ball bearings 30 roll, after forming the slide table 24, for example, by means of metal injection molding.

As shown in FIGS. 5 to 8, the processing jig 102 includes a shaft section 104 which is connected to an unillustrated rotary driving source (for example, a motor), and a disk-shaped polishing section (processing section) 106 (for example, a grinding wheel) which is connected to the end of the shaft section 104.

Figure 8:
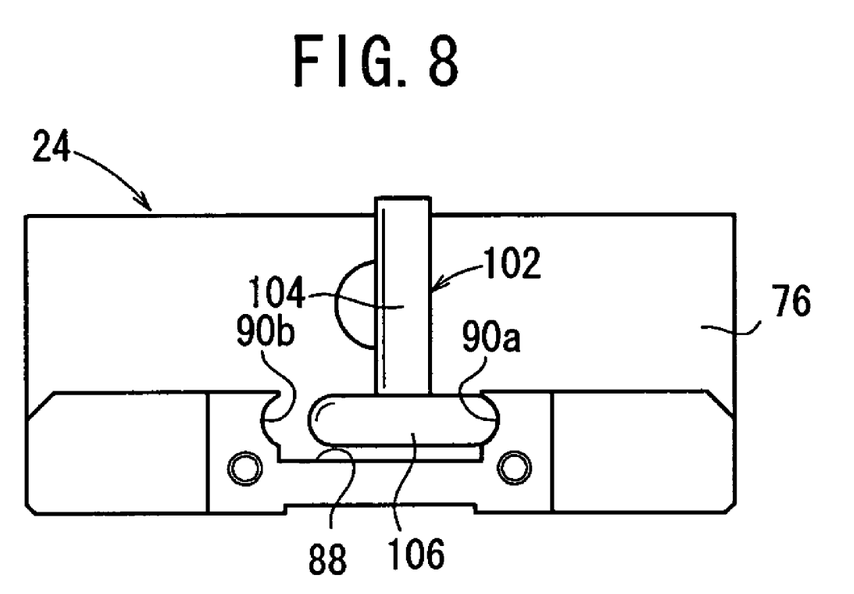
FIG. 8 is a schematic side view illustrating a situation in which the slide table shown in FIG. 6 is processed.

The outer circumferential portion of the polishing section 106 is formed to have a substantially circular arc-shaped cross section corresponding to the cross-sectional shape of the ball-rolling groove 90a, 90b (see FIGS. 7 and 8). When the rotary driving source is rotated, the polishing section 106 is rotated together with the shaft section 104. The processing jig 102 is movable in the horizontal direction (directions of the arrows A and B) substantially parallel to the axis of the slide table 24 and in the vertical direction substantially perpendicular to the axis, by means of an unillustrated movement unit.

When the ball-rolling grooves 90a, 90b are processed and polished by using the processing jig 102, the processing jig 102 is driven and rotated under the driving action effected by the rotary driving source. As shown in FIGS. 6 and 7, the polishing section 106 is moved from the one end of the slide table 24 communicated with the outside to the space between the ball-rolling grooves 90a, 90b. The polishing section 106 is allowed to abut against one ball-rolling groove 90a to displace the polishing section 106 linearly on a straight line at a predetermined speed toward the bent section 76 (in the direction of the arrow A). Accordingly, the ball-rolling groove 90a is polished by the polishing section 106 in the axial direction (direction of the arrow A).

The polishing section 106 arrives at the end of one ball-rolling groove 90a while making the rotation, and the polishing process is completed for the ball-rolling groove 90a. After that, the polishing section 106 is further displaced toward the bent section 76 (in the direction of the arrow A), and the polishing section 106 enters the relief groove 92. The displacement of the processing jig 102 in the substantially horizontal direction, which has been effected by the unillustrated moving unit, is stopped. In this situation, the outer circumferential surface of the polishing section 106 in the rotating state does not make contact with the slide table 24, because the relief groove 92 is formed to have the wide width in the direction to make separation from the axis of the slide table 24 as compared with the ball-rolling groove 90a.

As a result, the contact with the slide table 24 can be avoided such that the rotating polishing section 106 is moved to the relief groove 92 after the completion of the polishing process for one ball-rolling groove 90a. Therefore, it is possible to prevent the polishing section 106 from being abraded. Further, the slide table 24 is prevented from being polished unnecessarily and excessively by the polishing section 106.

Subsequently, the polishing section 106, which is in the rotating state, is moved toward the ball-rolling groove 90b in the relief groove 92 by the aid of the unillustrated moving unit. That is, the polishing section 106 is moved in the widthwise direction of the slide table 24 so that the polishing section 106 approaches the other ball-rolling groove 90b. The polishing section 106 is moved in the axial direction of the slide table 24 from the relief groove 92 toward the other ball-rolling groove 90b (in the direction of the arrow B). In this situation, the polishing section 106 makes no contact with the ball-rolling groove 90b in the relief groove 92. Therefore, the ball-rolling groove 90b is not polished by the polishing section 106.

The displacement amount of the processing jig 102 in the widthwise direction as to the slide table 24 is set to such a displacement amount that the outer circumferential surface of the polishing section 106 is capable of making abutment against one ball-rolling groove 90a or the other ball-rolling groove 90b.

The polishing section 106 is allowed to abut against the ball-rolling groove 90b, and the polishing section 106 is displaced linearly on a straight line at a predetermined speed in the direction to make separation from the bent section 76 (direction of the arrow B). Accordingly, the other ball-rolling groove 90b is polished in the axial direction (direction of the arrow B) by the polishing section 106. When the polishing section 106 arrives at the open one end of the slide table 24, the polishing process is completed for the ball-rolling grooves 90a, 90b of the slide table 24.

As described above, in the embodiment of the present invention, the relief groove 92, which is recessed to have the substantially rectangular shape, is provided adjacently to the bent section 76 on the lower surface portion of the slide table 24. Therefore, when the pair of ball-rolling grooves 90a, 90b of the slide table 24 are processed, then the processing jig 102 can be once moved to the relief groove 92 after processing one ball-rolling groove 90a with the processing jig 102, and the movement direction of the processing jig 102 can be switched by the aid of the relief groove 92 to process the other ball-rolling groove 90b again.

Accordingly, even in the case of the slide table 24 which has the bent section 76 that is provided at the end of the table section 74 while being bent with respect to the table section 74 and which has the ends of the ball-rolling grooves 90a, 90b closed by the bent section 76, the processing can be performed such that the processing jig 102, which is inserted from the one end of the slide table 24, is moved along one ball-rolling groove 90a, and the processing jig 102 is reversed by the aid of the relief groove 92 to move the processing jig 102 along the other ball-rolling groove 90b. In this way, the polishing process can be efficiently applied to the pair of ball-rolling grooves 90a, 90b by means of the processing jig 102 for the slide table 24 which has the bent section 76.

The polishing section 106 of the processing jig 102 is moved to the relief groove 92 during the period between the processing for one ball-rolling groove 90a and the processing for the other ball-rolling groove 90b. Accordingly, the polishing section 106 can be temporarily in the non-contact state with respect to the slide table 24. Therefore, it is possible to suppress the generation of heat which would be otherwise caused between the polishing section 106 and the slide table 24. It is possible to improve the durability of the processing jig 102.

Next, an explanation will be made about the operation of the linear actuator 20 in which the ball-rolling grooves 90a, 90b of the slide table 24 are processed by means of the processing jig 102.

First, an unillustrated fluid pressure supply source is energized to supply the pressure fluid to the first fluid inlet/outlet port 64a. In this situation, the second fluid inlet/outlet port 66a is open to the atmosphere under the switching action of an unillustrated directional control valve.

The pressure fluid is supplied to the first cylinder chamber 60 disposed on one side communicated with the first fluid inlet/outlet port 64a. The piston 40 is pressed by the pressure fluid toward the rod cover 52 (in the direction of the arrow A). The slide table 24, which is engaged with the piston rod 42, is displaced in the direction of the arrow A under the pressing action of the piston 40. The slide table 24 is displaced under the rolling action of the ball bearings 30.

On the other hand, when the slide table 24 is displaced in the direction of the arrow B reversely to the above, the pressure fluid, which has been supplied to the first fluid inlet/outlet port 64a, is supplied to the second fluid inlet/outlet port 66a disposed on the other side under the switching action of the unillustrated directional control valve. In this situation, the first fluid inlet/outlet port 64a is open to the atmosphere.

The pressure fluid, which is supplied from the second fluid inlet/outlet port 66a, is introduced into the second cylinder chamber 62. The piston 40 is pressed by the pressure fluid toward the end cap 44 (in the direction of the arrow B). The slide table 24, which is engaged with the piston rod 42, is displaced in the direction of the arrow B under the pressing action of the piston 40.

The explanation has been made for the method for processing the slide table 24 described above about the case in which the processing is performed from one ball-rolling groove 90a by means of the processing jig 102. However, there is no special limitation thereto. The other ball-rolling groove 90b may be processed first by using the processing jig 102, and then one ball-rolling groove 90a may be processed by the aid of the relief groove 92.

Columnar roller bearings, which are applied in Japanese Laid-Open Patent Publication No. 7-110011, may be adopted in place of the ball bearings 30, in the linear actuator 20 described above. Further, the cross-sectional shapes of the ball-rolling grooves 32a, 32b, 90a, 90b formed for the slide table 24 and the guide section 28 may be changed from the substantially semicircular shapes into substantially V-shaped forms corresponding to the roller bearings.

On the other hand, the shape of the relief groove 92 of the slide table 24 is not limited to the substantially rectangular shape formed in the long form in the direction substantially parallel to the bent section 76 as described above. For example, it is also allowable to adopt a slotted hole shape in which a pair of circular arc-shaped surfaces 154a, 154b are provided on inner wall surfaces of a relief groove 152 as in a slide table 150 according to a first modified embodiment shown in FIGS. 9 and 10.

Figure 9:
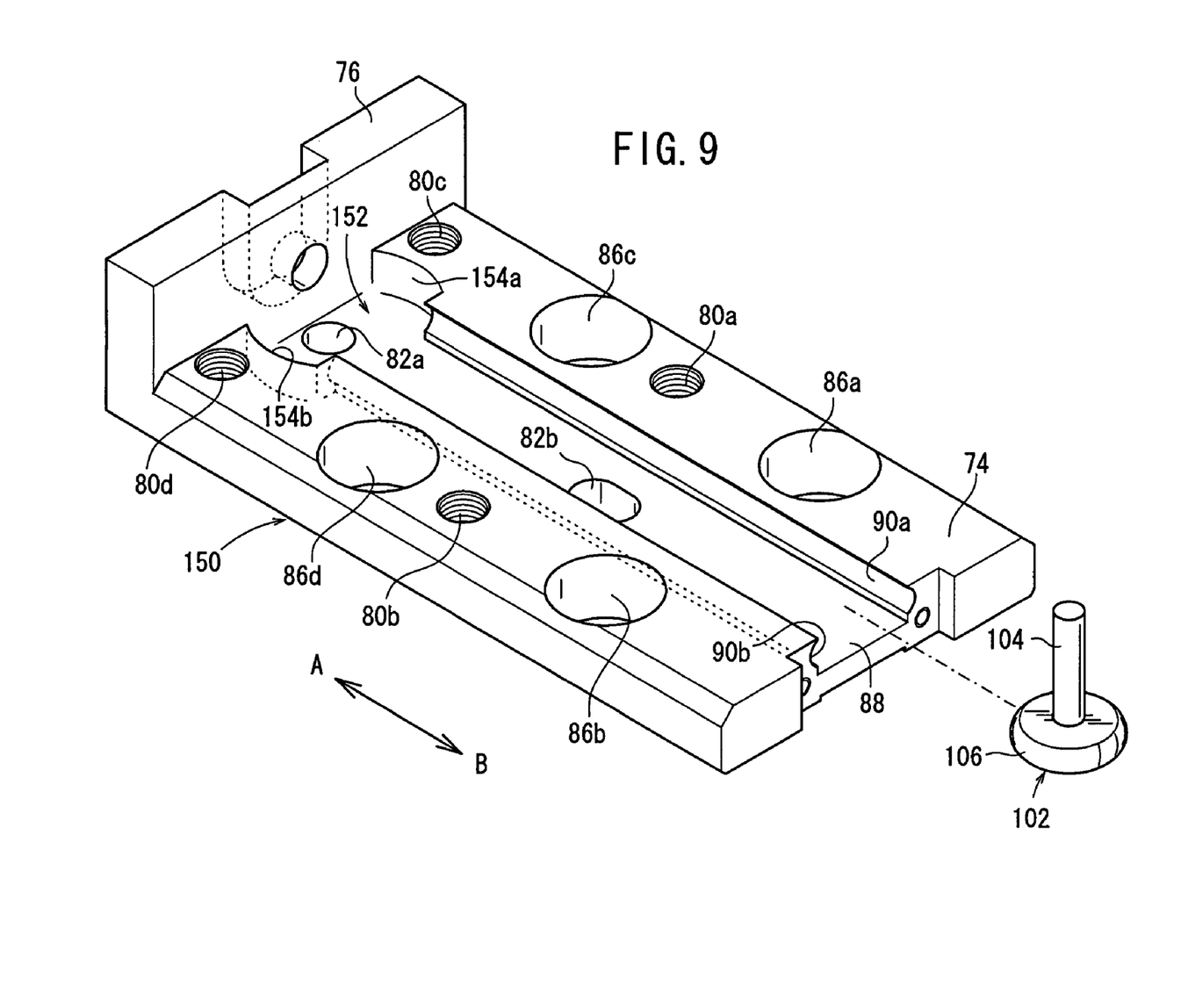
FIG. 9 is a perspective view illustrating a slide table according to a first modified embodiment formed with a relief groove having a pair of circular arc-shaped surfaces.
Figure 10:
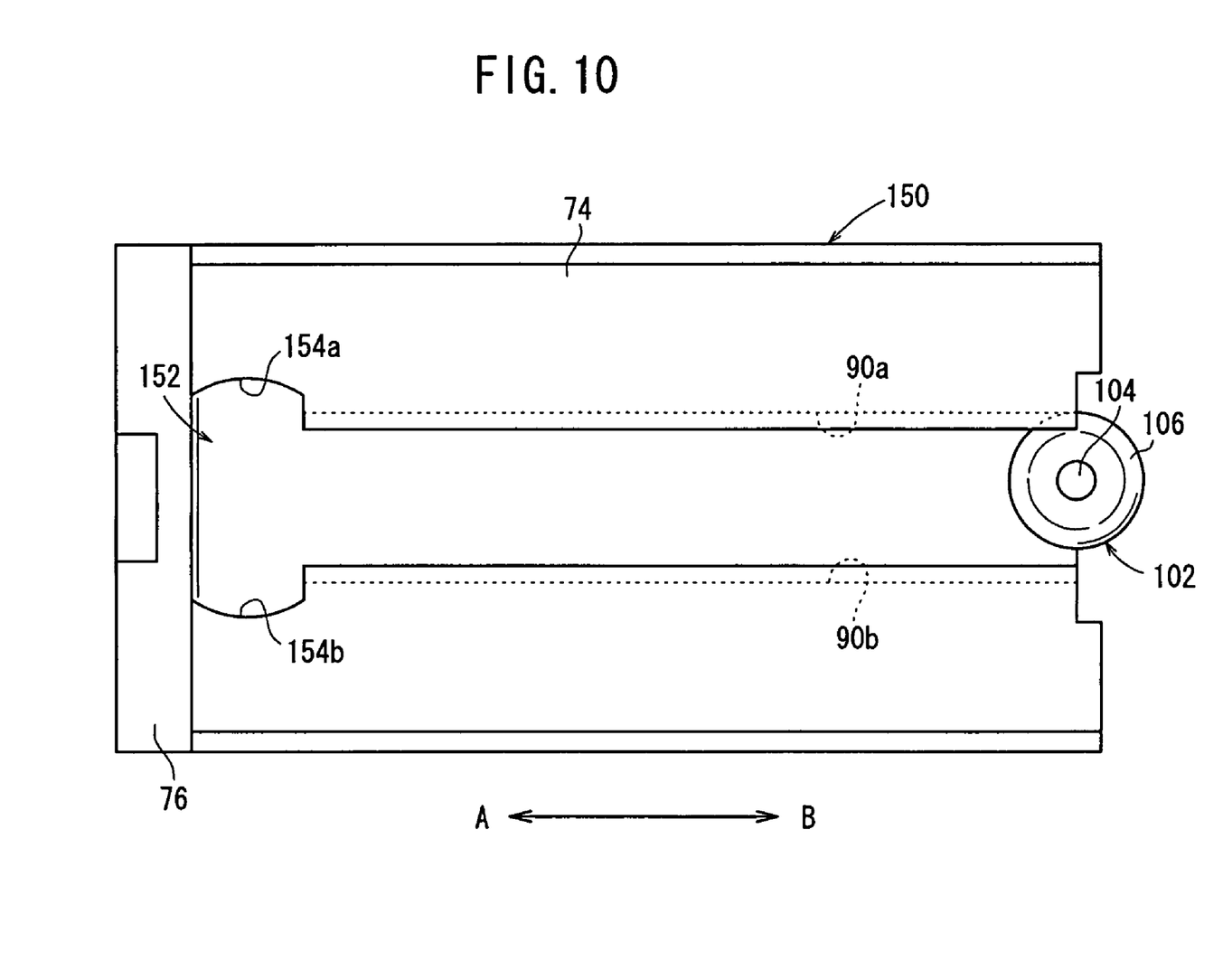
FIG. 10 is a schematic plan view illustrating the slide table shown in FIG. 9 as viewed from a side of a bent section.

As for the circular arc-shaped surfaces 154a, 154b, the inner wall surfaces, which are disposed adjacently to the workpiece-retaining holes 80c, 80d, are concave in the circular arc-shaped form respectively toward the workpiece-retaining holes 80c, 80d. It is preferable that the radius of the circular arc-shaped surface 154a, 154b is set to be substantially equivalent to the radius of the polishing section 106 which constitutes the processing jig 102. Accordingly, when the processing jig 102 is moved to the relief groove 152, the processing jig 102 makes no contact with the relief groove 152 owing to the circular arc-shaped surfaces 154a, 154b. The contact with the processing jig 102 is appropriately avoided.

Figure 11:
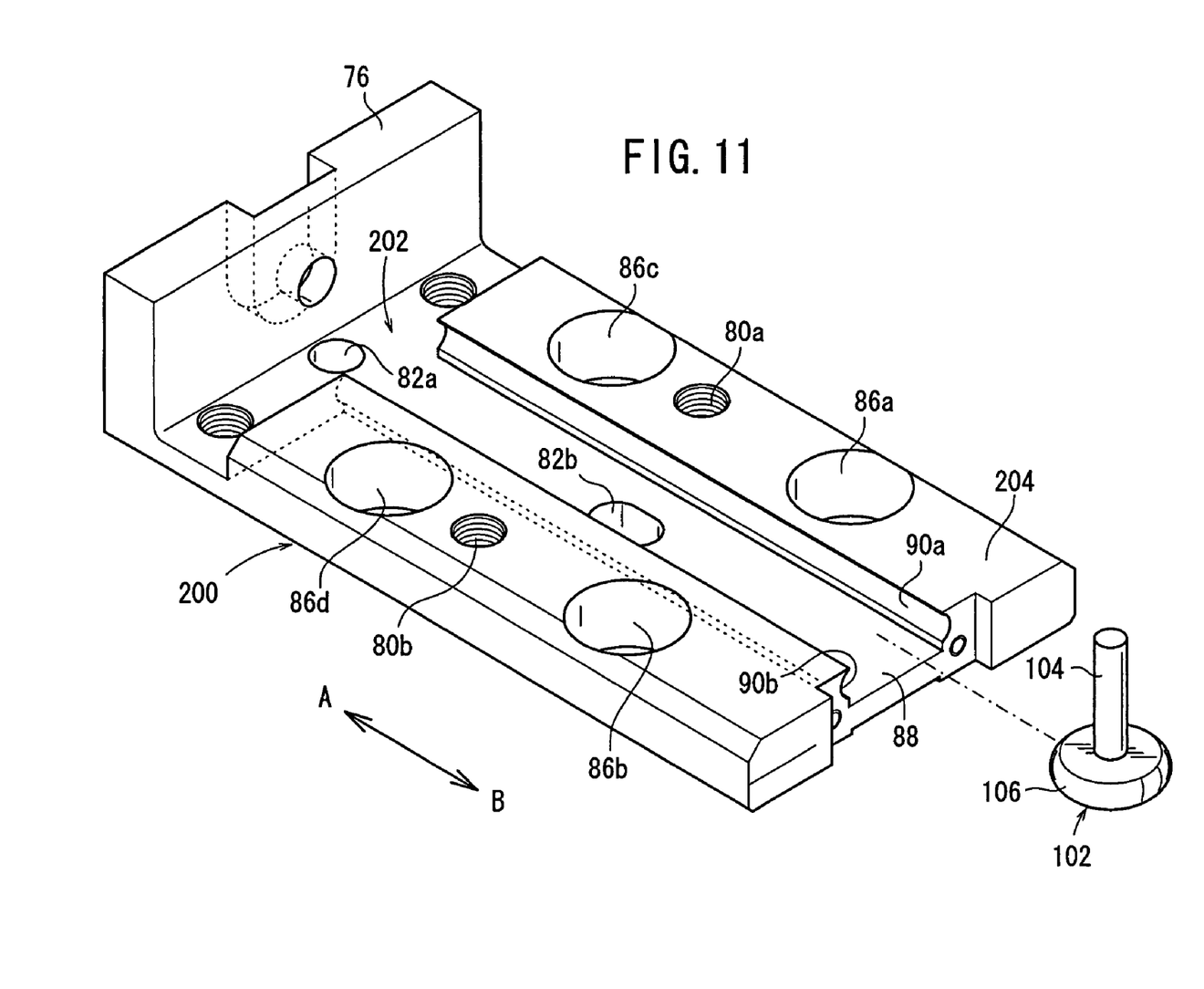
FIG. 11 is a perspective view illustrating a slide table according to a second modified embodiment provided with a relief groove to make penetration substantially in parallel to a bent section.
Figure 12:
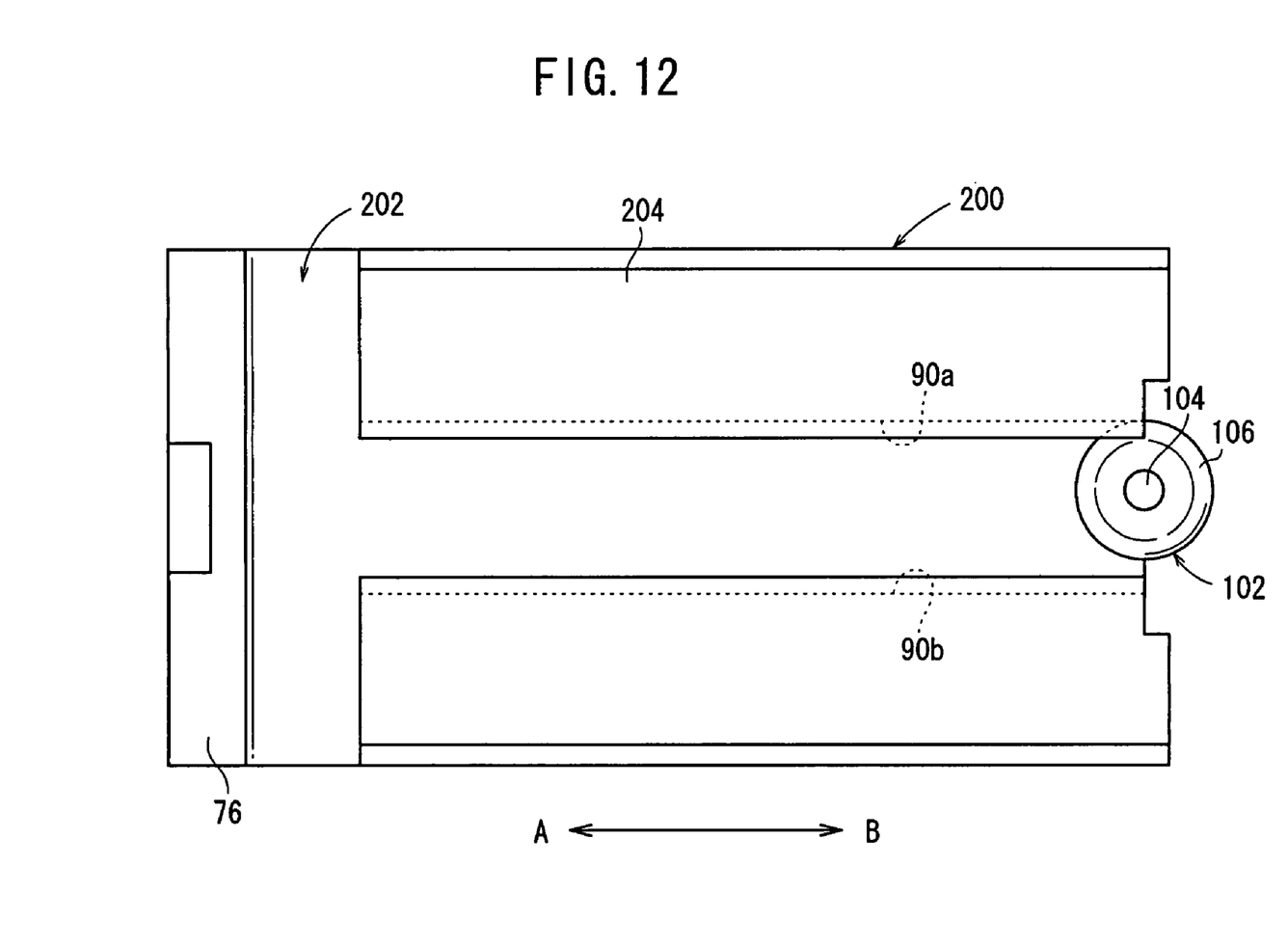
FIG. 12 is a schematic plan view illustrating the slide table shown in FIG. 11 as viewed from a side of a bent section.

Further, a relief groove 202 may be provided substantially in parallel to the bent section 76, and the relief groove 202 may be allowed to make penetration in the widthwise direction of the table section 204 at a predetermined depth, as in a slide table 200 according to a second modified embodiment shown in FIGS. 11 and 12. That is, the relief groove 202, which is provided adjacently to the bent section 76, extends so that the relief groove 202 is substantially perpendicular to the axis of the slide table 200.

Accordingly, the relief groove 202 is easily processed, and the processing time can be reduced by allowing the relief groove 202 to penetrate in the widthwise direction of the table section 204, as compared with the case in which the substantially rectangular relief groove 92 (see FIG. 6) is formed for the table section 74 as in the slide table 24 of the linear actuator 20 described above.

Further, the embodiment of the present invention described above has been explained about the case in which the pair of ball-rolling grooves 90a, 90b are directly formed on the slide table 24. However, there is no special limitation thereto. For example, a pair of rolling rails 252a, 252b, on which the ball-rolling grooves 90a, 90b are formed, may be provided separately from a slide table 250, and the rolling rails 252a, 252b may be installed to a pair of installation grooves 254a, 254b which are formed in the guide groove 88 of the slide table 250 respectively, as in the slide table 250 according to a third modified embodiment shown in FIGS. 13 and 14. The rolling rails 252a, 252b are integrally secured to the slide table 250, for example, by means of welding, adhesion, crimping or the like.

Figure 13:
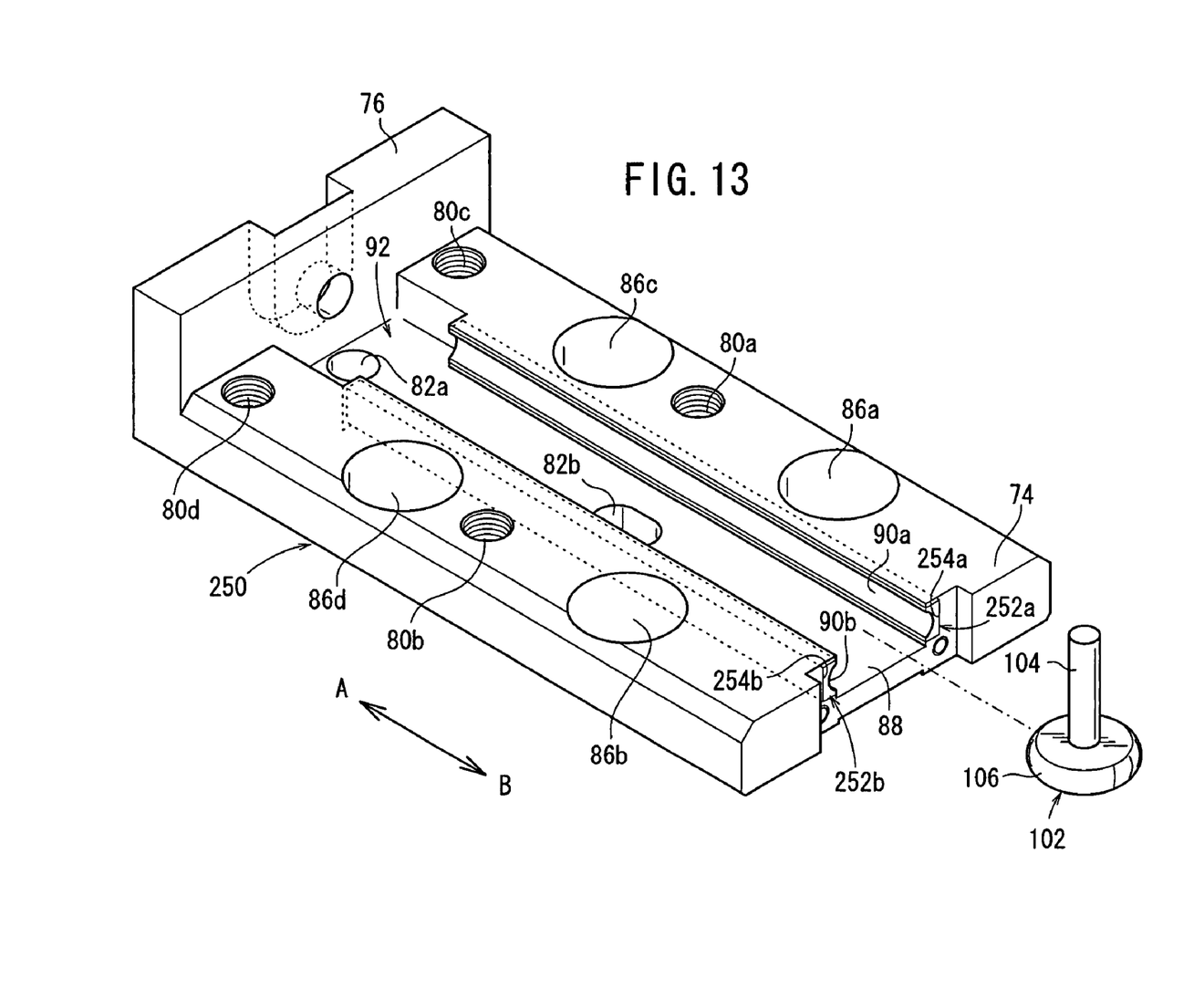
FIG. 13 is a perspective view illustrating a slide table according to a third modified embodiment installed with rolling rails having ball-rolling grooves which are formed separately from a slide table.
Figure 14:
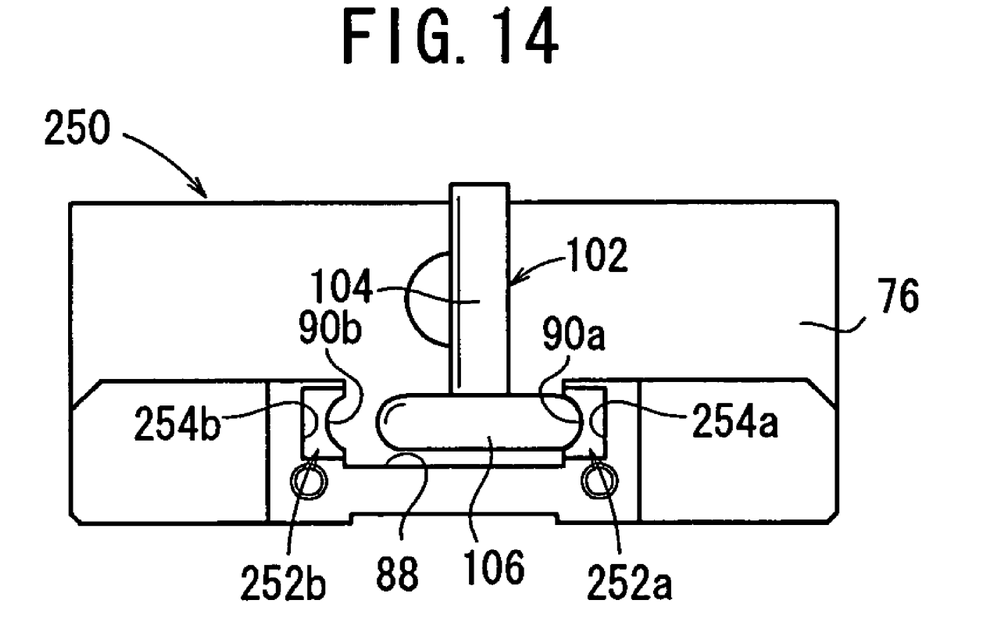
FIG. 14 is a schematic plan view illustrating the slide table shown in FIG. 13 as viewed from a side of a bent section.

The installation grooves 254a, 254b are formed on the inner wall surfaces of the guide groove 88 opposed to the ball-rolling grooves 32a, 32b of the guide section 28 respectively when the slide table 250 is installed to the main cylinder body 22. When the rolling rails 252a, 252b are installed to the installation grooves 254a, 254b, the ball-rolling grooves 90a, 90b of the rolling rails 252a, 252b are opposed to the ball-rolling grooves 32a, 32b of the guide section 28.

That is, the rolling rails 252a, 252b, which have the ball-rolling grooves 90a, 90b, can be formed of a material different from a material of the slide table 250. Therefore, when the rolling rails 252a, 252b are formed of the material having a high strength as compared with the slide table 250, it is possible to appropriately reduce the abrasion of the rolling rails 252a, 252b caused by the rolling movement of the ball bearings 30.

The slide tables 24, 150, 200, 250 are not limited to the case in which they are formed by means of the integrated formation to have the substantially L-shaped cross sections. The table sections 74, 204 may be formed separately from the bent section 76 respectively, and the table sections 74, 204 may be allowed to abut against the bent section 76 to perform the integrated joining by means of any joining method including, for example, welding, adhesion, and brazing.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A linear actuator comprising:
   a main cylinder body which is formed with cylinder chambers communicated with fluid inlet/outlet ports;
   a slider which reciprocates in an axial direction of said main cylinder body and which has a flat surface section disposed substantially in parallel to said axis and a bent section formed and bent at an end of said flat surface section;
   a guide mechanism which includes a guide rail formed along said axis of said main cylinder body, and a plurality of rolling members which make rolling movement along rolling grooves formed on side surfaces of said guide rail and said slider opposed to said guide rail, said guide mechanism guiding said slider in said axial direction of said main cylinder body; and
   a recess which is formed on a side of said bent section on said flat surface section opposed to said guide rail, which is communicated with a pair of said rolling grooves of said slider, and which has a widthwise dimension perpendicular to an axis of said slider, said widthwise dimension being larger than a spacing distance between one of said pair of said rolling grooves and another of said pair of said rolling grooves.

2. A method for processing a linear actuator comprising a main cylinder body which has fluid inlet/outlet ports; a slider which reciprocates in an axial direction of said main cylinder body and which has a flat surface section disposed substantially in parallel to said axis, and a bent section formed and bent at an end of said flat surface section; and a plurality of rolling members which make rolling movement along a pair of rolling grooves formed on side surfaces of said slider, said slider being opposed to a guide rail formed along said axis of said main cylinder body; said rolling grooves being processed by means of a rotated processing jig; said method for processing said linear actuator comprising the steps of:
   processing one of said rolling grooves by allowing said rotated processing jig to abut against said one rolling groove and displacing said processing jig toward said bent section of said slider along said one rolling groove;
   displacing said processing jig having been displaced to an end of said one rolling groove, to a recess which is communicated with said one rolling groove and which is formed on a side of said bent section and displacing said processing jig from a side of said one rolling groove to a side of another rolling groove opposed to said one rolling groove in said recess; and
   processing said other rolling groove by displacing said processing jig from inside of said recess toward said other rolling groove and displacing said processing jig along said other rolling groove in a state in which said processing jig abuts against said other rolling groove.

3. The method for processing a linear actuator according to claim 2, wherein said recess is formed to be larger than a diameter of a processing section of said processing jig, which is rotatable under a driving action of a rotary driving source and which processes said rolling grooves.

4. The method for processing a linear actuator according to claim 3, wherein said rolling grooves are formed to have a substantially semicircular cross-sectional shape corresponding to said rolling members, which are formed to be spherical, and an outer circumferential surface of said processing section is formed to have a substantially circular arc-shaped cross-sectional shape having substantially the same radius corresponding to said cross-sectional shape of said rolling grooves.

5. The method for processing a linear actuator according to claim 4, wherein said recess has a pair of circular arc-shaped surfaces which are concave in directions perpendicular to said axis of said slider and which correspond to said shape of said processing section, and said processing section is formed to have substantially the same radius as that of said circular arc-shaped surfaces.

6. The method for processing a linear actuator according to claim 4, wherein said recess extends substantially in parallel to said bent section and penetrates in a widthwise direction of said flat surface section.

* * * * *